INVENTORS.
JOHN H. JACOBS
CHARLES F. ROBINSON
BY Peter Berliner
ATTORNEY.

INVENTORS.
JOHN H. JACOBS
CHARLES F. ROBINSON
BY. [signature]
ATTORNEY.

3,427,629

INFORMATION RECORDING

John H. Jacobs, Altadena, and Charles F. Robinson, Pasadena, Calif., assignors to Bell & Howell Company, Chicago, Ill., a corporation of Illinois Continuation-in-part of application Ser. No. 568,155, July 27, 1966. This application June 22, 1967, Ser. No. 652,390
U.S. Cl. 346—1 11 Claims
Int. Cl. G01d 9/42

ABSTRACT OF THE DISCLOSURE

Method for photographic recording, and retrieval with collimated monochromatic light, in the form of overlapping non-linear, but patterned, lines of information.

CROSS-REFERENCE TO RELATED APPLICATION

This application is a continuation-in-part of application Ser. No. 568,155, filed July 27, 1966, entitled "Information Recording" and now abandoned.

BACKGROUND OF THE INVENTION

*Field of the invention*

The fields of art to which the invention pertains includes the fields of holographic photography, optics and photographic recorders.

*Description of the prior art*

One method for storing digital computer information on photographic film is to record each bit of information as a density or lack of density on the film. Although high resolution films are available that have the theoretical capacity to store large volumes of data, as a practical matter present recording processes make use of only a small part of such resolution. As the information bits are made smaller, they are more difficult to locate and retrieve. Further, even minute specks of dirt can obscure information bits and destroy accuracy.

As one method of obviating these difficulties, it has been proposed to photographically record digital information in the form of small conventional, i.e., of linear spacing, diffraction grating elements (R. L. Lamberts and G. C. Higgins, "Digital Data Recording on Film Using Superimposed Grating Patterns. I. General Theory and Procedures," Photo. Sci. and Eng. 10 209–213, 1966). It has been suggested to superimpose a number of these gratings of different spatial frequency on the same small area of film. Thus, if a particular film area were to contain seven information bits as a maximum recoverable quantity, the same amount of information could be stored in the same area by superimposing seven diffraction grating patterns in that area, each of a different linear spatial frequency. The information is read out by projection through the film of monochromatic collimated light. Each diffraction grating produces a readout at an angle governed by its spatial frequency, yielding seven first-order lines. By placing a photodetector at the position of each first-order line, the presence or absence of a particular spatial frequency can be determined. Since the first-order lines can be spread with appropriate lenses, the geometry of the readout system is flexible. Of equal importance, each bit of information is spread over an area on the film seven times as large as previously used for that bit, even though the total area used is the same. Thus, the effect of small dirt particles is obviated.

However, even this system has significant drawbacks. Second-order lines are formed with sufficient intensity to limit the number of superimposable grating patterns. Accordingly, all spatial frequencies must be contained within a single octave. Further, a complex and expensive lens system is required to enable information to be accurately retrieved.

SUMMARY OF THE INVENTION

The foregoing drawbacks are mitigated by providing a process of storing information on photographic film, the information being retrievable by readout with collimated monochromatic light, which comprises recording the information in the form of overlapping non-linear, but patterned, lines. The spatial relationship of the lines in each pattern is governed by the formula $$r_n=[(k+n\lambda)^2-k^2]^{1/2}$$

wherein $k$ is an independently selected constant for each pattern, $\lambda$ is the wavelength of monochromatic light, $r_n$ is the distance of each line in the pattern from an imaginary point and $n$ is an integer, unique for each line in the pattern, lying within an integer range unique for each pattern of the same $k$ value. Under ideal circumstances, all the lines are in sequence so that the value of $n$ progresses by unity from one line to the next. Some lines may be omitted; resolution is consequently decreased but still useful.

Thus, by means of our invention, a series of overlapping patterns are recorded in a single area of film. Each pattern is composed of lines having the above-designated internal spatial relationship. These relationships are such that when a collimated monochromatic beam of light of wavelength $\lambda$ is projected through the developed original a first-order line is obtained for each pattern. Readout is obtained by intercepting the lines with appropriately placed photodetectors. Because the spatial distribution of the lines in each pattern is non-linear and follows the above formula, the gratings have some lens properties and lenses may be dispensed with for some readout geometries. Further, the above spatial relationship results in second-order lines of greatly reduced or substantially zero intensity enabling an extension of data recording capacity to at least third-order lines. Where some second-order effect is present, it will be reduced in intensity to the point where a threshold response can be provided (i.e., using photodetectors responding to intensities of light greater than from such weak second-order lines); or the pattern can be chosen so that the second-order lines, if any, are adjacent to, but not superimposed on, first-order lines generated by other information bits. This is not practical with prior art devices since their second-order lines are of such intensity as to result in severe interference.

Several methods can be used to record the line patterns with the above-designated relationship. In one method, a wavefront of a beam of collimated monochromatic light impinges on an area of the film and a portion of the beam is diverted, by beam splitters and mirrors or other means, as a plurality of light beams impinging with curved wavefronts on the same area of film. This gives rise to interference patterns which are described by the above-designated relationship. By selectively controlling the number and location of these latter light beams, information represented by such number and location of these latter light beams, information represented by such number and location can be stored on the film. On readout, as above, first-order lines will be obtained reproducing the information.

In another method of recording, the information is recorded by imaging onto the film a cathode ray tube line scan which is distributed as a composite of patterns that are in conformity with the above-designated spatial relationship. This can be accomplished by making the cathode ray tube responsive to an appropriate time base generator. Alternatively, the cathode ray tube is made responsive to an appropriate frequency generator. The spatial distribution is then modulated by selective signal control of the time base or frequency generator. Such control methods are well known in the art.

DESCRIPTION OF THE PREFERRED EMBODIMENTS

Figure 1:
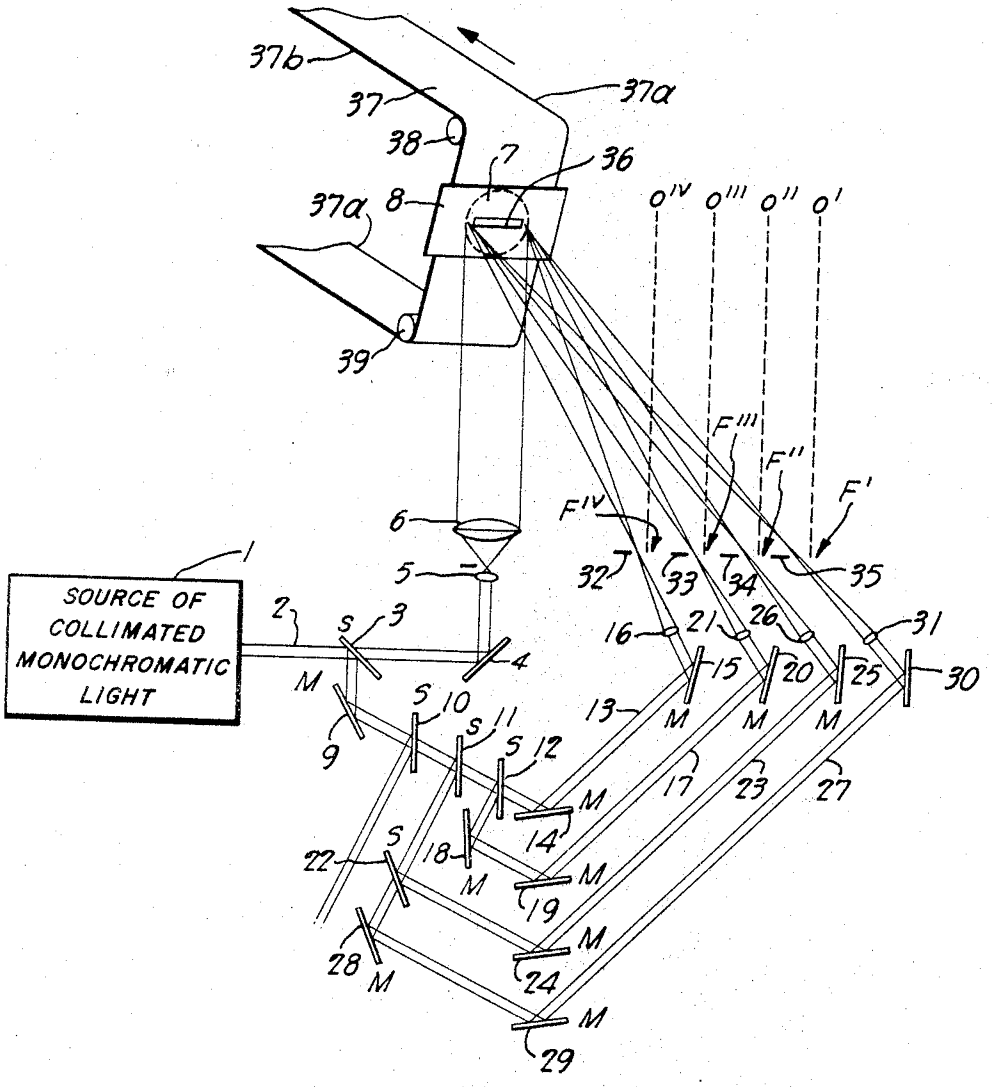
FIGURE 1 is a partially perspective, partially diagrammatic view of a recording means of this invention using plane and curved wavefronts of light.

Referring to FIGURE 1, one system of recording is shown wherein four information bits are recorded simultaneously. (More bits can be recorded, but only four are shown for purposes of clarity.) A source of collimated monochromatic light 1, e.g., helium-neon laser light of 6328 A., is provided from which a collimated light beam 2 is projected and passes through a beam splitter 3. A portion of the beam is then reflected by a mirror 4, passes through lenses 5 and 6 (passing by a shutter shown diagrammatically by a dash line between the lenses 5 and 6) and emerges with an expanded plane wavefront 7 which impinges on a plate 8. Each beam splitter allows approximately 50 percent of the beam to pass through, reflecting the remaining 50 percent of the beam. For clarity, each beam splitter and mirror in FIGURE 1 is labeled S and M, respectively. That portion of beam 2 reflected from beam splitter 3 is reflected from mirror 9 and passes successively through beam splitters 10, 11 and 12. The resulting beam 13 is reflected from mirrors 14 and 15, through lens 16 and onto plate 8 with a spherical wavefront overlapping wavefront 7.

In a similar manner that portion 17 of the collimated beam reflected from beam splitter 12 is reflected from mirrors 18, 19 and 20, through lens 21 and onto plate 8 with a spherical wavefront, overlapping wavefront 7. Approximately 50 percent of that portion of the collimated beam reflected from beam splitter 11 is reflected by beam splitter 22. The resulting beam 23 is reflected from mirrors 24 and 25, through lens 26, onto plate 8, as a spherical wavefront, overlapping wavefront 7. That portion 27 of the collimated beam passing through beam splitter 22 is reflected from mirrors 28, 29 and 30, through lens 31 and onto plate 8 as a spherical wavefront, overlapping wavefront 7. Shutters 32, 33, 34 and 35 are provided, and located at the narrowest points on beams 13, 17, 23 and 27, and can be selectively opened and closed so that a selected number and position or order of wavefronts of light beams 13, 17, 23 and/or 27 can be superimposed onto wavefront 7.

Plate 8 contains an exposure slit 36 which overlies a firm strip 37 that is movable past slit 36, e.g., by means of dispensing and take-up rolls (not shown) and guide rollers 38 and 39. As the film strip 37 moves past exposure slit 36, it is maintained in position momentarily. At that point, shutters 32, 33, and 34 and 35 are selectively opened or left closed to record from 0 to 4 bits of information, superimposed on an area of film strip 37 immediately behind exposure slit 36. The firm strip then moves on for the next exposure.

In FIGURE 1, the lenses 16, 21, 26 and 31 are spherical. Alternatively, cylindrical lenses could be used. These would form cylindrical wavefronts falling on plate 8.

Figure 2:
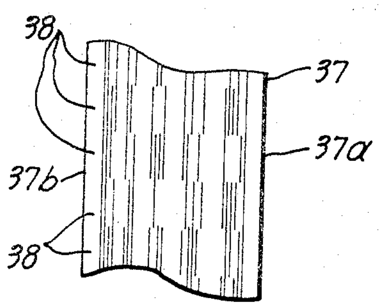
FIGURE 2 is a plan view of developed film obtained by means of the invention.

Referring to FIGURE 2, when the film strip 37 is developed, pattern lines 38 appear which represents the pattern obtained by interference of the plane wavefront 7 and one or more of the spherical, or cylindrical, wavefronts from beams 13, 17, 23 and/or 27. Thus, pattern lines 38 represent a summation of the lines of each individual pattern associated with the individual beams 13, 17, 23 and/or 27. The lines 38 are straight when cylindrical wavefronts are used. They are arcs of circles when spherical wavefronts are used.

Figure 3:
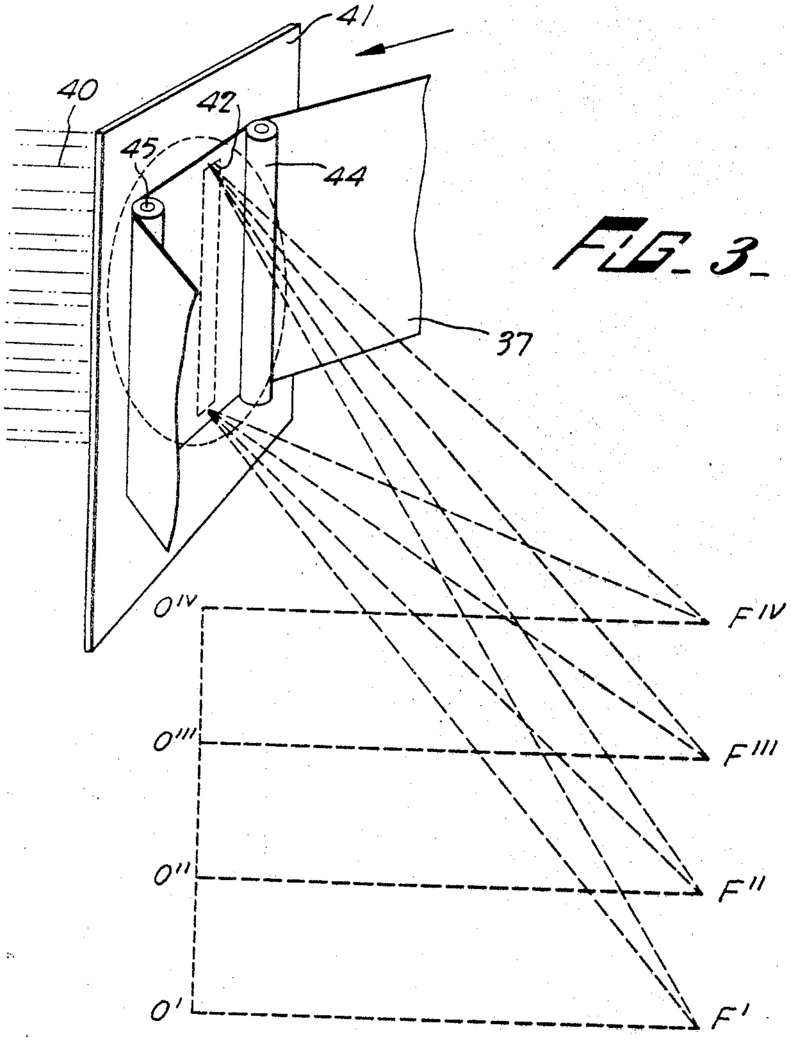
FIGURE 3 is a partially perspective, partially diagrammatic view of a read out means for retrieving information from the film of FIGURE 2.

Referring to FIGURE 3, a system of readout of film 37 is shown. A plate 41 is provided containing a projection slit 42 of the approximate dimensions of exposure slit 36 of FIGURE 1. Film 37 is moved past exposure slit 42 by means of guide rollers 44 and 45 and momentarily stopped for projection therethrough of a collimated beam of monochromatic light 40 of the same wavelength as light beams 2, 13, 17, 23 and 27 in FIGURE 1. First-order lines are thereby obtained (designated $F^{I}$, $F^{II}$, $F^{III}$ and $F^{IV}$) which correspond to the shutter positions 32, 33, 34 and 35, i.e., the narrowest beam points $F^{I}$, $F^{II}$, $F^{III}$, and $F^{IV}$, in FIGURE 1. By placing photodetectors at points $F^{I}$ and $F^{II}$, $F^{III}$ and $F^{IV}$ (FIGURE 3) the presence or absence of a first-order line can be detected. Information bits are thereby retrieved. When cylindrical wavefronts are used for recording, finer focusing can be obtained by focusing through a cylindrical lens.

Since the patterns of lines 38 represent arcs of circular interference patterns, these patterns will focus the points $F^{I}$, $F^{II}$, $F^{III}$ and $F^{IV}$ at the focal point of the corresponding interference circles. As noted, photo-detectors can be placed at those points. Alternatively, an appropriate lens may be placed thereat whereby the distance between the points $F^{I}$, $F^{II}$, $F^{III}$ and $F^{IV}$ is expanded and photodetectors appropriately placed.

In the above definition of $r_n$, reference was made to an imaginary point. This represents the center of an imaginary circle in which each line $n$ is at a distance $r_n$. Referring to the diagrams in FIGURES 1 and 3, the interference lines generated on the film strip 37 for beams 27, 23, 17 and 13 originate, photographically, at points $F^{I}$, $F^{II}$, $F^{III}$ and $F^{IV}$, respectively. A line drawn from these points to a plane along the center of the arcs intersects that plane at points $O^{I}$, $O^{II}$, $O^{III}$ and $O^{IV}$ which are the "imaginary points" referred to above. $r_n$ in the above formula is then the distance from these points for the respective light beams. Distance F–O is the constant $k$.

Figure 4:
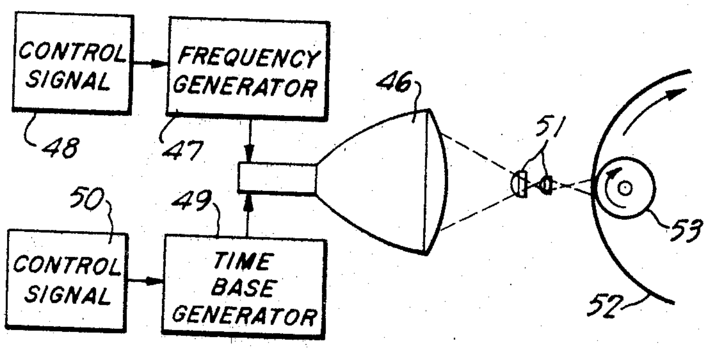
FIGURE 4 is another recording means of this invention using a cathode ray tube line scan.

Referring to FIGURE 4, an alternate method of recording the information patterns is shown. A cathode ray tube 46 is provided and the information to be recorded is presented on the face of the tube in the form of a light beam which is distributed in a spatial relationship governed by the above formula and intensity modulated to yield overlapping patterns. Essentially, the overlapping line patterns impinging on plate 8 and film strip 37 is reproduced on the face of the cathode ray tube. This can be accomplished by making the cathods ray tube responsive to a time base generator 49 which in turn is responsive to a control signal 50. Spatial distribution is obtained through the control signal 50 by selective modulation of the time base generator 49. Alternatively, the cathode ray tube is made responsive to a frequency generator 47 which in turn is responsive to a control signal 48. Spatial distribution is obtained through the control signal 48 by selective modulation of the frequency generator 47.

The line scan on the face of the cathode ray tube 46 is imaged by means of lens system 51 onto film strip 52 while it is moving over roller 53, yielding line patterns similar to that described with respect to FIGURE 2. The line patterns are different, however, in that there is no element of curvature, i.e., they are as if recorded with a cylindrical wavefront.

Film strip 52 is read out in the same manner as film strip 37 is read out as described with regard to FIGURE 3. However, for finer focusing cylindrical lenses can be placed prior to the points of focus, as would be done for images recorded with a cylindrical wavefront.

We claim:

1. A process of storing information on photographic film, the information being retrievable by readout with collimated monochromatic light, which comprises recording the information in the form of overlapping non-linear patterns of lines, the spatial relationship of the lines in each pattern being governed by the formula $$r_n = [(k - n\lambda)^2 - k^2]^{1/2}$$

wherein $k$ is an independently selected constant for each pattern, $\lambda$ is the wavelength of said light, $r_n$ is the distance of each line in the pattern from an imaginary point and $n$ is an integer, unique for each line in the pattern, lying within an integer range unique for each pattern of the same $k$ value.

2. The process of claim 1 wherein $k$ is the same for all patterns.

3. The process of claim 1 wherein the information is recorded by the simultaneous and overlapping recording of a wavefront of collimated monochromatic light and a plurality of curved wavefronts of said light.

4. The process of claim 3 wherein said curved wavefronts are cylindrical.

5. The process of claim 3 wherein said curved wavefronts are spherical.

6. A process of storing information on photographic film, the information being retrievable by readout with collimated monochromatic light, which comprises simultaneously recording a plane wavefront of collimated monochromatic light superimposed with a plurality of curved wavefronts of said light containing the information.

7. The process of claim 1 wherein the information is recorded by imaging a cathode ray tube line scan distributed in said spatial relationship and intensity modulated to yield said overlapping patterns.

8. The process of claim 7 wherein said cathode ray tube is responsive to a time base generator and the spatial distribution is modulated by selective signal control of the time base generator.

9. The process of claim 7 wherein the cathode ray tube is responsive to a frequency generator and the spatial distribution is modulated by selective signal control of the frequency generator.

10. Information storage means comprising photographic film, a source of collimated monochromatic light yielding a beam thereof, means for impinging a collimated plane wavefront of said light on an area of the film, means for diverting a portion of the beam as a plurality of light beams, means disposed between said diverting means and said film imparting a curved wavefront on each of said plurality of light beams whereby said light beams impinge with curved wavefronts on said area and means for selectively controlling the impingement of said curved wavefronts.

11. A method for recording and retrieving information comprising: recording the information in the form of overlapping non-linearly spaced patterns of density lines on an area of photographic film, the spatial relationship of the lines in each pattern being governed by the formula $$r_n = [k + n\lambda)^2 - k^2]^{1/2}$$

wherein $k$ is an independently selected constant for each pattern, $\lambda$ is the wavelength of said light, $r_n$ is the distance of each line in the pattern from an imaginary point and $n$ is an integer, unique for each line in the pattern, lying within an integer range unique for each pattern of the same $k$ value, said patterns yielding first-order lines when a beam of collimated monochromatic light is projected therethrough; projecting a beam of said light through said film; and detecting the presence of said first-order lines.

References Cited

UNITED STATES PATENTS

| | | | |
|---|---|---|---|
| 3,312,955 | 4/1967 | Lamberts et al. ------ | 340—173 |
| 3,364,497 | 1/1968 | MacAdam ---------- | 346—108 |

RICHARD B. WILKINSON, *Primary Examiner.*

J. W. HARTARY, *Assistant Examiner.*

U.S. Cl. X.R.

346—108; 340—173